US006646598B1

(12) United States Patent
Timothy et al.

(10) Patent No.: US 6,646,598 B1
(45) Date of Patent: Nov. 11, 2003

(54) ANTENNA BORESIGHTING METHOD

(75) Inventors: LaMar K. Timothy, Kaysville, UT (US); Merle L. Keller, Salt Lake City, UT (US); Roy F. Lunsford, Syracuse, UT (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 10/150,606

(22) Filed: May 17, 2002

(51) Int. Cl.$^7$ .................................................. H01Q 3/00

(52) U.S. Cl. ....................................................... 342/359

(58) Field of Search ........................... 342/75, 359, 424, 342/425, 427; 343/754, 757, 758

(56) References Cited

U.S. PATENT DOCUMENTS

| 4,823,134 | A | * | 4/1989 | James et al. | 342/359 |
| 5,347,286 | A | * | 9/1994 | Babitch | 342/359 |
| 6,400,315 | B1 | * | 6/2002 | Adler et al. | 342/359 |

* cited by examiner

Primary Examiner—Dao Phan
(74) Attorney, Agent, or Firm—Harrington & Smith, LLP

(57) ABSTRACT

An antenna positioned (with rough alignment) on an aircraft is calibrated in position and orientation relative to the inertial navigation system of the aircraft by measuring the corresponding position and orientation parameters of the aircraft and a reference target relative to the Global Positioning System (GPS) and calculating differences between azimuth and elevation parameters of the target measured by the antenna control system and corresponding roll, pitch and heading parameters measured by the aircraft system, thereby providing bias parameters for the antenna output in the coordinates of the inertial navigation system.

10 Claims, 4 Drawing Sheets

ANTENNA BORESIGHTING METHOD

TECHNICAL FIELD

The field of this invention is radar and RF communications, in particular specifying the orientation of a highly directional airborne antenna.

BACKGROUND OF THE INVENTION

In the field of radar and highly directional RF communications antennas, it is necessary to calibrate the angular orientation and position of an antenna in order to use the output of the antenna to specify the azimuth and elevation of the object that the antenna points to. The angular orientation of the antenna (usually the centerline of a parabolic dish reflector) is called the Line-of-Sight (LOS) or RF axis of the antenna. The antenna LOS is the direction of maximum transmitted and received RF energy. Ideally, as shown in FIG. 1, a local antenna (110) LOS is pointed at a remote antenna (200) along a straight line connecting the two antennas. The straight line connecting two antennas is also called the LOS. High frequency RF, radar, and light essentially travel in a straight line.

For example, an antenna mounted on a local airborne (A/B) platform 110 or aircraft (A/C) points to a remote target aircraft 200. In order to point the local antenna LOS at the remote target A/C antenna, the local antenna control computer must have the following information: a) local A/C position (latitude, longitude, and altitude) from the local navigator computer and remote A/C position from the remote navigator; and b) the orientation (roll, pitch, and heading shown in FIG. 2) of the local A/C from the local navigator. This navigational information is used to calculate (specify) and command azimuth and elevation antenna gimbal angles, with respect to the local A/C, to point at the remote target as shown in FIG. 6. FIG. 6 illustrates a portion of a computer system 100, in which antenna control computer 50 sends signals to the antenna gimbal servos 70, receiving input from keyboard 55 and from INS 60. Box 80 represents other portions of a system, such as disk drives, memory for storing software according to the invention, CRTs, other computers processing other input data (e.g. data indicating the general location of a potential target, etc.). In the example of target acquisition, information on the general location of a potential target may come from a coarse antenna on board the A/C or from a remote source, such as an AWACs plane. The antenna computer takes the INS data from system 60 and commands the antenna system 70 to sweep over the approximate location until acquisition occurs. After acquisition of the remote A/C, it will send location data over the data link. The signals sent to the antenna (and received from the antenna and transmitted to other parts of the system) will be corrected by bias values determined in the inventive procedure.

The antenna azimuth and elevation gimbals with resolvers (for sending measurements of the actual pointing direction of the antenna), in an xyz frame, determine the antenna coordinate system. This system must be aligned with the A/C navigator $X_1$ roll, $Y_1$ pitch, and $Z_1$ heading coordinates as shown in FIG. 3 illustrating the relationship of the coordinate systems. Alignment of xyz to $X_1 Y_1 Z_1$ is called "LOS boresighting". Alignment can be achieved either mechanically or with computer software. This invention presents a software method.

In the past, the coordinates were mechanically measured in a lengthy process involving surveyor's methods using theodolites, tape measures, and aligned with mechanical shims to adjust the azimuth and elevation orientations of the antenna to match the A/C navigator roll, pitch, and heading coordinates. Most methods involving survey theodolites, tapes, and shims have been very time consuming.

Highly directional airborne antennas can be pointed with an accuracy of about +/−0.1 degree when referenced to the vehicle's Inertial Navigation System (INS). The art has felt a need for a quick, economical method of boresighting consistent with this accuracy.

SUMMARY OF THE INVENTION

The invention relates to a method of boresighting an antenna mounted to an aircraft in which the Global Positioning System (GPS) is used to provide input to the boresighting process.

A feature of the invention is a set of measurements of a cooperative target RF source that points the A/B antenna LOS at a known location in space.

Another feature of the invention is the software calculation of adjustment parameters that adjusts radar and RF LOS output data without physically changing the orientation of the antenna.

DESCRIPTION OF THE INVENTION

Figure 1:
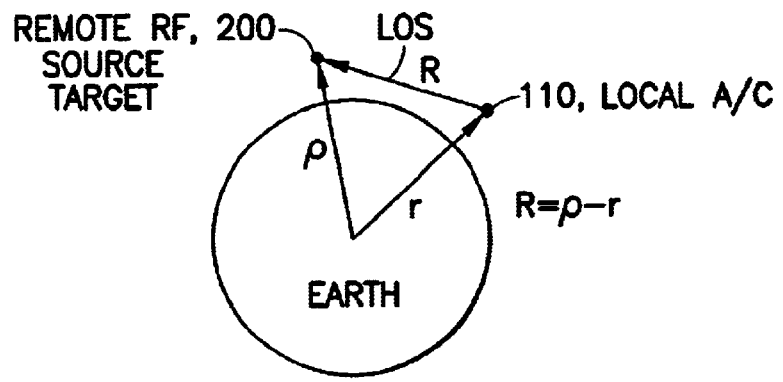
FIG. 1 illustrates the relationship of aircraft and target vectors.

Referring to FIG. 1, there is shown the relationship between a local aircraft 110, a remote RF source target 200, and vectors between the aircraft and the target and between both the aircraft and target and the center of the earth. R is the LOS vector pointing from the local platform aircraft to the target, with r being the position vector of the aircraft in earth centered coordinates, rho ($\rho$) the corresponding position vector of the target in earth centered coordinates.

Figure 4:
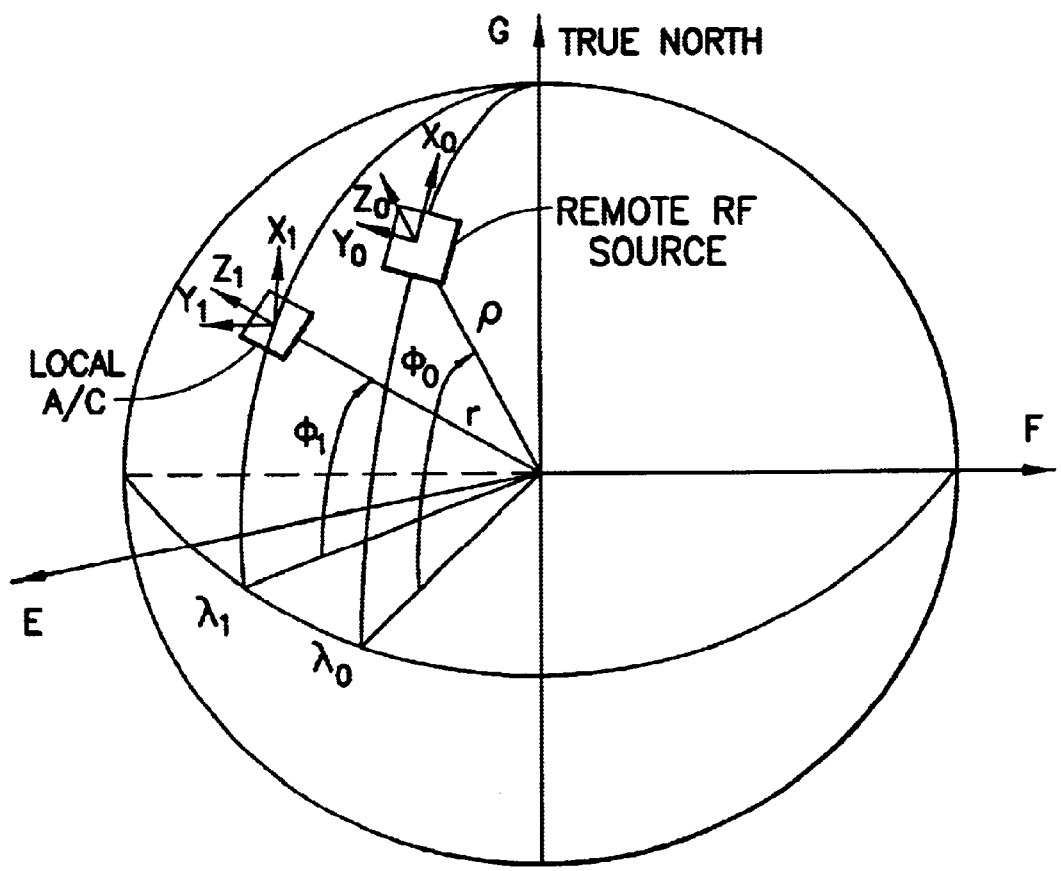
FIG. 4 illustrates the process in spherical coordinates.

The local platform aircraft has an Inertial Guidance System (INS) that uses a coordinate system based on latitude, longitude, and altitude of the aircraft reference point, plus the orientation of the aircraft (roll, pitch, and heading). The precision antenna has a computer controlled pointing coordinate system that outputs commands of elevation and azimuth relative to the aircraft coordinates. In the boresighting procedure the remote target aircraft is replaced with an RF radiating source as the RF boresight target as shown in FIG. 4. The LOS of the RF source is pointed at the local aircraft.

The proposed method requires as a preliminary step a Differential Global Positioning System (DGPS) survey between the A/B antenna and RF boresight target. The Inertial Navigation System (INS) of the aircraft must be in operation to measure roll, pitch, and heading of the aircraft. The A/C is parked at two arbitrary headings separated by about 60 to 120 degrees. Although the INS reference point on the A/C and the A/B antenna may be separated by several feet, the DGPS latitude, longitude, and altitude data will effectively put the INS at the A/B antenna assuming the A/C body is rigid while the tests are underway. Airframe flexing is assumed to be less then +/−0.1 degree during the test. Instead of using mechanical shims to align the antenna to the airframe, a software coordinate rotation is used.

Figure 6:
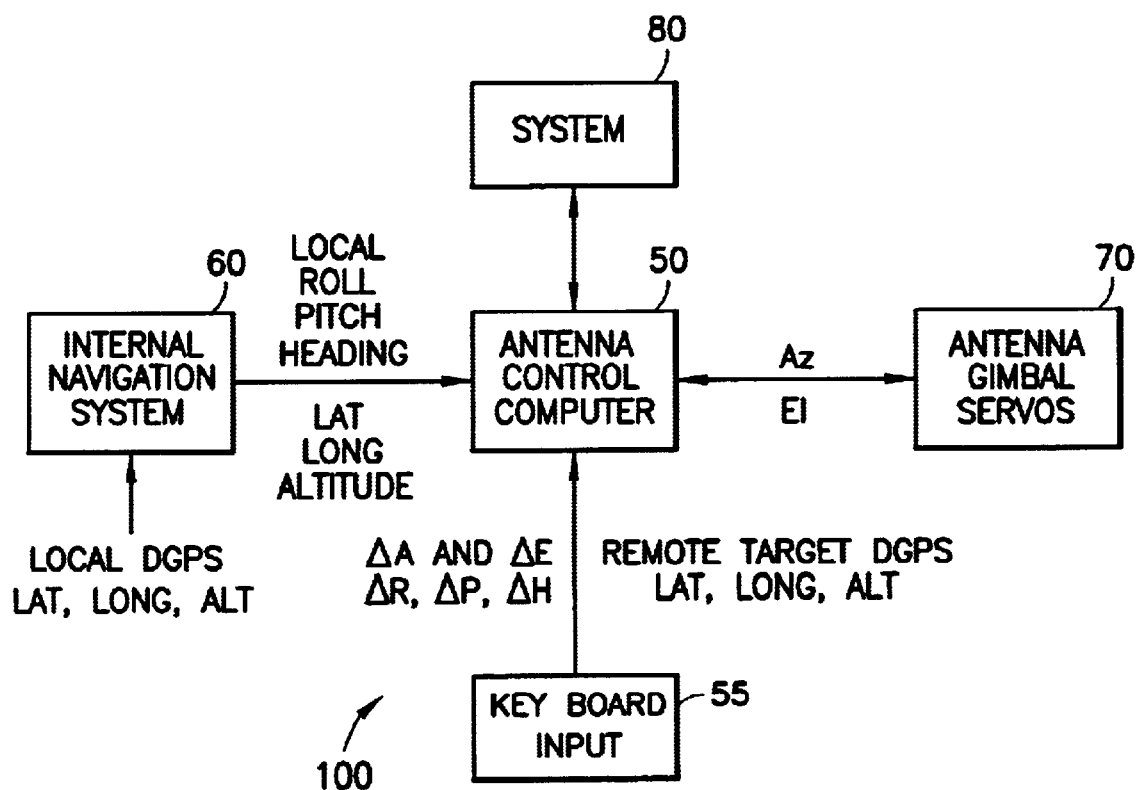
FIG. 6 illustrates components of a computer system.

The RF boresight target source is located between 1 and 10 kilometers from the A/C at a high location to avoid multipath problems. Since +/−0.1 degree equals about +/−1.7 milliradians or +/−1.7 meters (5.7 feet) cross range per kilometer, the 1 kilometer restriction allows the sensitivity of the relative locations of the GPS receivers to be +/−2 feet. Therefore, if the GPS receivers are located to within +/−2 feet of A/B and boresight antenna feeds respectively, less than +/−0.1 degree survey error can be maintained. The 10 kilometer restriction allows a flat earth assumption (since the earth curves about 0.1 degree Per 11 Km). The goal of this method is to align the antenna RF xyz axes directly to the inertial navigator $X_1$ $Y_1$ $Z_1$ axes, by-passing the airframe coordinates. The ultimate coordinate frame is the earth itself to which the navigator is aligned. From position and orientation navigational data received from the local INS and position of the remote RF boresight source, the A/B antenna computer calculates Azimuth (Az) and Elevation (El) command angles to point the antenna at the RF source as shown in FIG. 6.

Figure 2:
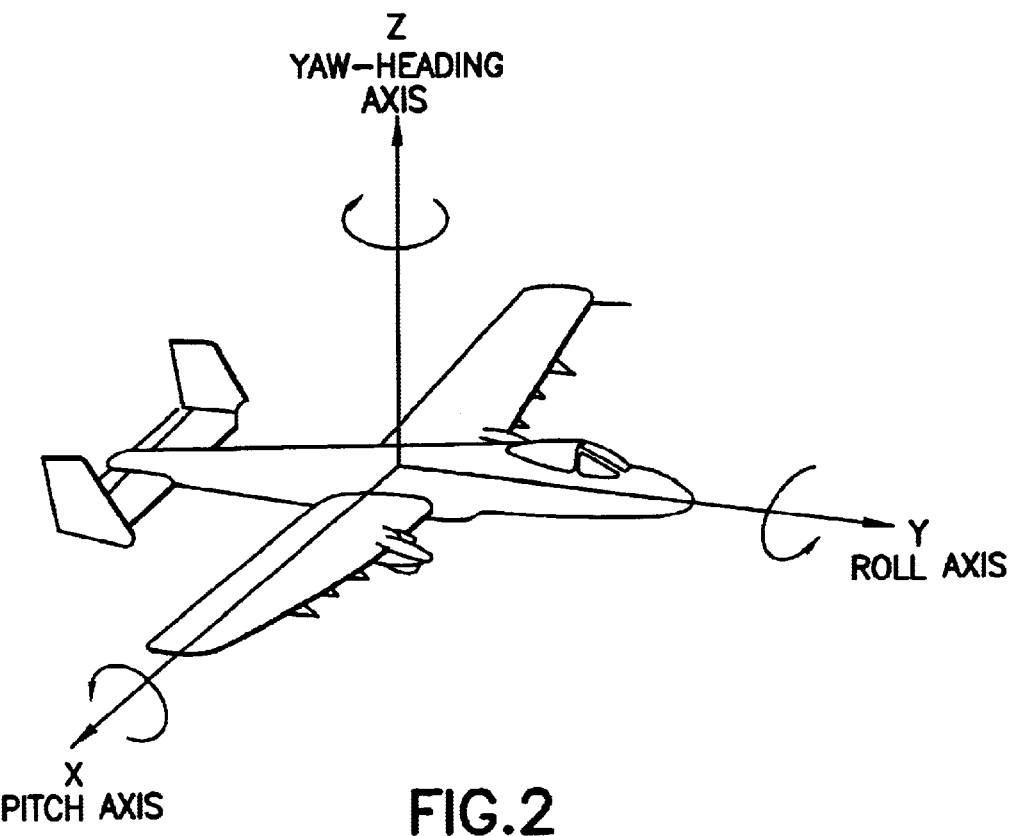
FIG. 2 illustrates the aircraft coordinate system.

Referring now to FIG. 2, there is shown a stylized aircraft at position $X_1$ $Y_1$ $Z_1$ coordinate having Roll, Pitch, and Heading values that are respectively: Roll is the counter-clock-wise (ccw) rotation about the y axis (right wing down) measured from the x-y plane.

Pitch is the ccw angular rotation about the x axis (nose up) measured from the x-y plane.

Heading is the clockwise (cw) angular rotation about the z axis (nose right) measured relative to y-z plane. The heading axis is also the yaw axis and the azimuth axis.

The transformation from the INS $X_1$ $Y_1$ $Z_1$ coordinate system to the antenna xyz and Az, El coordinates are direct without going through an intermediate calculation of in terms of the airframe coordinate system. From FIG. 1 the vectors R=LOS between local and remote A/C, ρ=position of remote A/C, and r=position of local A/C) are related by $$R = \rho - r = \begin{bmatrix} X_1 \\ Y_1 \\ Z_1 \end{bmatrix}$$

Which reduce to the matrix components $$\begin{bmatrix} X_1 \\ Y_1 \\ Z_1 \end{bmatrix} = [R][P][H]\left\{[Lat_{loc}][Long_d][Lat_{rem}]\begin{bmatrix} 0 \\ 0 \\ \rho \end{bmatrix} - \begin{bmatrix} 0 \\ 0 \\ r \end{bmatrix}\right\}$$

If the antenna xyz frame is aligned to the INS $X_1$ $Y_1$ $Z_1$ frame, then $$\begin{bmatrix} x \\ y \\ z \end{bmatrix} = \begin{bmatrix} X_1 \\ Y_1 \\ Z_1 \end{bmatrix}$$

Then antenna Az and El angles can be calculated from $$Az = Tan^{-1}[x/y] \text{ and } El = Tan^{-1}[z/(x^2+y^2)^{1/2}]$$

The [R][P][H] matrices are the standard Euler rotations for local A/C roll, pitch, and heading respectively. The $[Lat_{loc}][Long_d][Lat_{rem}]$ matrices are Euler rotations for the local A/C latitude, A/C longitude difference, and remote A/C latitude as shown in FIG. 4.

Figure 3:
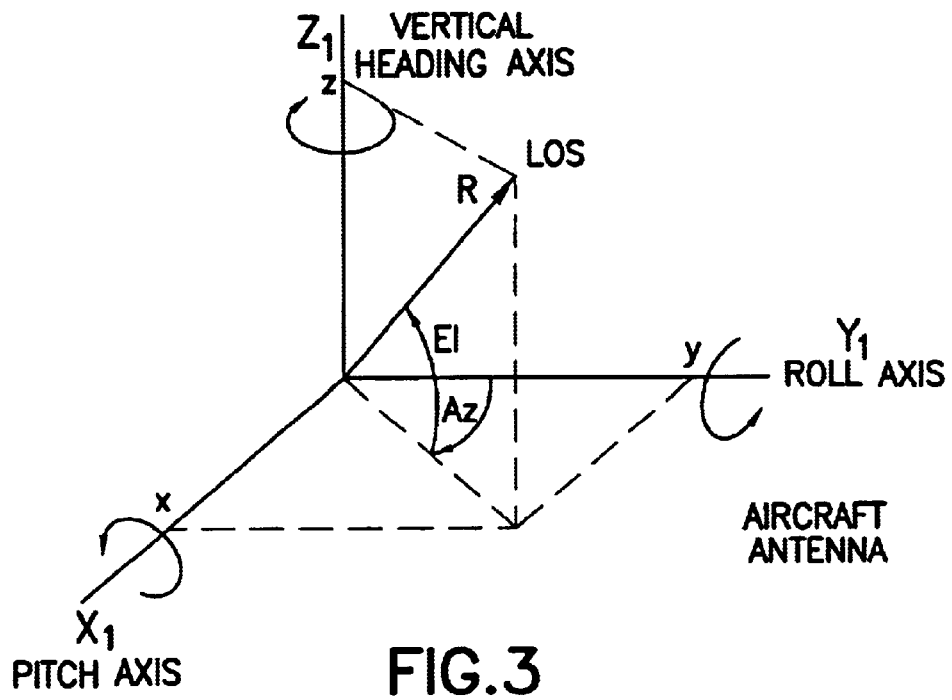
FIG. 3 illustrates the radar coordinate system.

FIG. 3 shows an equivalent relationship xyz and antenna coordinates El and Az:

z=R sin(El)
y=R cos(El)cos(Az)
x=R cos(El)sin(Az)

For the purposes of the following calculations, R will be taken to have unit magnitude.

The following method will align the A/B RF antenna axes to the INS to within +/−0.1 degrees. It is assumed the antenna is pointed with the A/C roll (R), pitch (P), and heading (H) angles and latitude, longitude, and altitude values from the INS. The latitude, longitude, and altitude of the remote RF target source are required also. The pointing calculations for El and Az are made in the antenna control computer as shown in FIG. 6. The antenna control computer transforms the antenna LOS from R,P,H, $Lat_{loc}$, $Long_d$, and $Lat_{rem}$ to produce the desired LOS in El and Az coordinates by adding biases according to the invention. [Step 10 in FIG. 5] As a preliminary step for the sequence shown in FIG. 5, complete a Differential GPS (DGPS) survey prior to antenna alignment. (Note it is assumed a DGPS survey system has 2 GPS antennas and respective receivers that log satellite data for processing in a DGPS computer. The survey is measured between the phase centers of the antennas. The locations of the receivers themselves are not critical and are placed conveniently near their respective antennas.) Place one GPS receiver antenna within about 2 feet from the antenna feed of the remote RF boresight target. The target, which is illustratively a directional antenna that can be pointed toward the local A/C is located 1 to 10 kilometers away from the anticipated position of the local A/B antenna. The boresight target should be as high as practical to minimize multipath interference. Place the other GPS receiver antenna within 2 feet of the local A/B antenna feed reference position projected on the ground (TARMAC). This position should be at a location where the A/C has clear line-of-sight (LOS) views to the boresight target and GPS satellites. Record latitude, longitude, and altitude of both GPS receivers. Also record azimuth and elevation angles between both GPS antennas as calculated by the DGPS computer software. If the local A/B antenna is located more than 2 feet above the TARMAC position, measure the height and correct the altitude and elevation DGPS readings. This survey can be relative and does not need to be absolutely tied to a survey control station.

Figure 5:
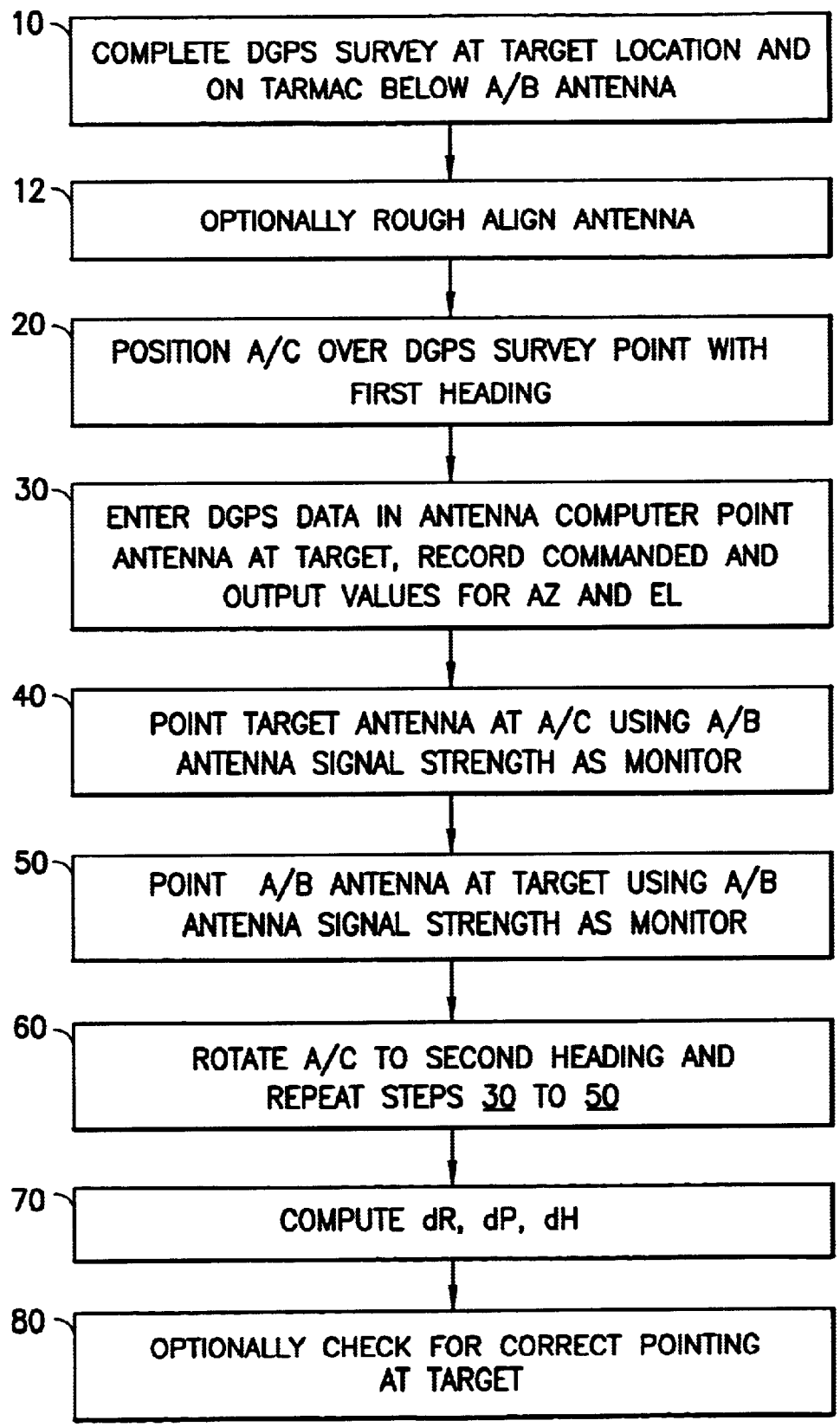
FIG. 5 illustrates steps in the inventive method.

[Optional step 12 in FIG. 5] Mount the A/B antenna to the airframe with the base level with respect to the airframe to within +/−2 degrees as measured by the antenna elevation axis. The zero antenna azimuth angle shall be mounted towards the A/C nose (roll) axis within +/−2 degrees. It is assumed that the A/C manufacturer has established an airframe coordinate system known to within +/−2 degrees and the navigator has been mounted accurately to this airframe coordinate system. This boresighting invention provides a fast, fine alignment procedure to achieve +/−0.1 degree LOS pointing accuracy, which is critical for antennas with beamwidths near 1 degree.

[Step 20 in FIG. 5] Place the A/C over the DGPS surveyed point on the ground or TARMAC such that the A/B antenna azimuth axis of rotation extended to the ground is within +/−2 feet of the survey point. Any A/C heading is satisfactory. [Step 30 in FIG. 5] Power up the local A/C Inertial Navigator System (INS) and initialize it with the latitude, longitude, and altitude from the TARMAC DGPS survey point as shown in FIG. 6, corrected for the height of the A/B antenna. Zero out software lever arm corrections in the antenna control computer (distance from the INS to the antenna), if any. Record A/C roll R, pitch P, and heading H from the INS. FIG. 4 illustrates the relationship of aircraft heading and target during this step. Enter the latitude, longitude, and altitude of the boresight target values from the DGPS survey into the antenna control computer and command the A/B antenna to point at the RF boresight target. It is assumed the antenna control computer has software code that will accept biases (constant values) that can be added to the INS R, P, and H values that aligns the xyz antenna frame to the $X_1$ $Y_1$ $Z_1$ INS frame. These bias values $\Delta R$, $\Delta P$, and $\Delta H$ are added to the INS R, P, and H in small increments by keyboard input such that the two frames can be brought into alignment as shown in FIG. 6.

Set to zero any residual biases in R, P, and H. Record the antenna azimuth and elevation values of both the antenna control computer commanded and resolver measured values. The commanded antenna azimuth plus A/C heading must agree with the DGPS azimuth survey value to within +/−1 degree before continuing. Also power up the A/B return link receiver and tune the pointing of the remote boresight RF antenna as follows. Communication between the remote boresight source and the A/B return link receiver is required. The remote RF source antenna is moved in angle until the maximum received RF is determined by the person at the A/B receiver. The maximum received RF signal can be determined by the receiver AGC output or an RF spectrum analyzer that plots the received RF spectrum. In the event that the remote RF source has a relatively flat angular intensity distribution, subtends less than +/−0.1 degree, or is omnidirectional, the preceding step can be omitted, as the angular orientation of the remote antenna will not affect the intensity in the local A/B system.

[Step 50 in FIG. 5] Tune (align) the pointing of the local A/B antenna by entering $\Delta A_1$ and $\Delta E_1$ biases via the key board into the antenna computer controller. Small values of about 0.05 degree are incremented for each $\Delta A_1$ and $\Delta E_1$ bias until the A/B AGC or RF spectrum analyzer peaks or is maximized. The A/B antenna must be under control based on navigator input data and the location of the remote boresight RF source. Record or save in the computer the final values of $A_1$ and $E_1$ that peaks the received RF.

[Step 60 in FIG. 5] Rotate the A/C heading about the TARMAC survey point keeping the A/B antenna extended azimuth axis to within +/−2 feet of it. The new A/C heading angle can range from 60 to 120 degrees of the first heading. Repeat steps 30 through 50 and calculate new $A_2$ and $E_2$ values.

Calculate biases for roll $\Delta R$, pitch $\Delta P$, and heading $\Delta H$ from the following equations:

$$\Delta E_1 - (\text{Sin } P_1 \text{ Sin } A_1 + \text{Sin } R_1 \text{ Cos } P_1 \text{ Cos } A_1)\Delta A_1 = \text{Sin } A_1 \Delta R - \text{Cos } A_1 \Delta P$$

$$\Delta E_2 - (\text{Sin } P_2 \text{ Sin } A_2 + \text{Sin } R_2 \text{ Cos } P_2 \text{ Cos } A_2)\Delta A_2 = \text{Sin } A_2 \Delta R - \text{Cos } A_2 \Delta P$$

where the subscripts 1 and 2 correspond to the first and second headings. The terms A and E are the commanded (input) antenna azimuth and elevation values for each heading. Solving for $\Delta R$ and $\Delta P$:

$$\Delta R = [-\cos(A_2)L_1 + \cos(A_1)L_2]/[\sin(A_2)\cos(A_1) - \sin(A_1)\cos(A_2)]$$

$$\Delta P = [-\sin(A_2)L_1 + \sin(A_1)L_2]/[\sin(A_2)\cos(A_1) - \sin(A_1)\cos(A_2)]$$

where $L = \Delta E - [\sin(P_1)\sin(A_1) + \sin(R_1)\cos(P_1)\cos(A_1)]$ $\Delta A_1 \Delta H$ is calculated from the following.

$$D_1 = \text{Sin } E_1 \text{ Sin } P_1 - \text{Cos } R_1 \text{ Cos } P_1 \text{ Cos } E_1 \text{ Cos } A_1$$

$$D_2 = \text{Sin } E_2 \text{ Sin } P_2 - \text{Cos } R_2 \text{ Cos } P_2 \text{ Cos } E_2 \text{ Cos } A_2$$

with subscripts 1 and 2 for each A/C heading. Then $$\Delta H_1 = [(\text{Cos } E_1 \text{ Cos } A_1)/D_1]\Delta A_1 - [(\text{Sin } E_1 \text{ Sin } A_1)/D_1]\Delta E_1 + [(\text{Sin } E_1)/D_1]\Delta R - [(\text{Sin } R_1 \text{ Cos } E_1 \text{ Cos } A_1)/D_1]\Delta P$$

$$\Delta H_2 = [(\text{Cos } E_2 \text{ Cos } A_2)/D_2]\Delta A_2 + [(\text{Sin } E_2 \text{ Sin } A_2)/D_2]\Delta E_2 + (\text{Sin } E_2)/D_2 \Delta R - (\text{Sin } R_2 \text{ Cos } E_2 \text{ Cos } A_2)/D_2 \Delta P$$

These equations must give the same answers for both delta headings within +/−0.05 degrees. Average both $\Delta H$ values for entry into the Antenna Control Computer.

Enter these calculated values of $\Delta R$, $\Delta P$, and $\Delta H$ into the Antenna Control Computer as corresponding biases. This step completes the A/B antenna boresighting.

As a consistency check, while the A/C is still parked at the second heading, check the final antenna boresighting with keyboard commands to move the A/B antenna. Verify that the commanded azimuth and elevation values with these biases have indeed maximized the AGC or the RF spectrum analyzer.

If this verification fails (not within +/−0.1 degree), check the DGPS survey for LOS to satellites and local multipath by checking the long term stability of survey value over 1 to 2 hours to a relative accuracy of +/−0.1 feet by checking the DGPS range differences. Multipath problems at ethier the RF boresight location or the A/B antenna location could be a problem. Multipath can be checked by moving the boresight antenna one foot or so and by changing the A/C headings 5 or 10 degrees.

FIG. 6 illustrates schematically the components of a typical workstation 600, comprising computer CPU 605, CDROM 610, often used for storing computer programs or large amounts of data, CRT display 615, keyboard 620, hard disk 625, mouse 630 and printer 635. Box 300 represents software according to the invention for carrying out various calculations. A listing of a program written in Ada, for carrying out calculations associated with the invention is shown in Table I.

TABLE I

```
-- PP Begin -----------------------------------------------------------------
--
-- $Description: This routine is called to compute the aux transformation
-- to
--    account for misalignment of the mounting of the antenna.
--    OST.Ant__Align.Aft__Antenna__Align__Mode is used for the 12 inch
--    antenna. The following cases are processed for Align__Mode
--    0 - This routine does not get called
--    1 - perform pass 1 of alignment for the first park position
--    2 - perform pass 2 of alignment for the second park position
--      and save pass 1 in NVM
--    3 - Compute mounting misalignment transformation and save
--      pass 2 in NVM
--    4 - Test the transformation by using it to point to the
--      source. The AGC should peak when it is tested.
--    5 - Store the transformation into NVM for future antenna
--      pointing that will correct for mounting misalignment
--    6 - N/A
--    7 - N/A
--    8 - N/A
--    9 - Exit the alignment mode and resrume normal operations
--    A - Zero the transformation
--    F - Stop NVM writes after one pass and wait for power off
--    The transform coefficients will reside in RAM at
```

TABLE I-continued

```
--   B - heading correction in 32 bit BAMS
--   C - pitch correction in 32 bit BAMS
--   D - roll correction in 32 bit BAMS
--   The transform coefficients will reside in NVM at
--   9B - heading correction in 32 bit BAMS
--   9C - pitch correction in 32 bit BAMS
--   9D - roll correction in 32 bit BAMS.$
--
-- $Task: 52$
- $Traceability: $
- $Exceptions: $
- $Keywords: $
- $Notes: $
-- PP End-----------------------------------------------------------------
--
Procedure Align_Antenna Using_NVM    : in out NVM.Table;
            And_OST        : in out Operational_State.Table;
            True_Az_E1     : in out ECDL_Types.LongAzE1) is
Wait_Time   : ECDL_Timer.Time;
Det : Float;
Sp1 : Float;
Sp2 : Float;
Sa1 : Float;
Sa2 : Float;
Sr1 : Float;
Sr2 : Float;
Se1 : Float;
Se2 : Float;
Cp1 : Float;
Cp2 : Float;
Ca1 : Float;
Ca2 : Float;
Cr1 : Float;
Cr2 : Float;
Ce1 : Float;
Ce2 : Float;
L1 : Float;
L2 : Float;
D1 : Float;
D2 : Float;
Dh1 : Float;
Dh2 : Float;
begin -- Align_Antenna
    case And_OST.Ant_Align.Aft_Antenna_Align_Mode is
        when 0 =>
            null;
        when 1 =>
-
And_OST.Scenario_Common.Platform_Setup.Shim_12_Inch_An-
tenna_HPR.
--   Heading :=0.0;
And_OST.Scenario_Common.Platform_Setup.Shim_12_Inch_An-
tenna_HPR.
--   Pitch :=0.0;
And_OST.Scenario_Common.Platform_Setup.Shim_12_Inch_An-
tenna_HPR.
--   Roll:=0.0;
    Antvec.PositionsToTrue(
    MyPosition    => And_OST.Ant_Align.Aft_Ant_GPS_Position
    TargetPosition => And_OST.Ant_Align.RF_Source_Position,
    True         => True_Az_E1);
    And_OST.HR_RxTx_Link_State.Angles :=True_Az_E1;
    Antvec.TrueToRelative(
    True        => And_OST.HR_RxTx_Link_State.Angles,
    Attitude    => And_OST.Nav_Frame.Attitude,
    Shim_HPR   => And_OST.Scenario_Common.
Platform_Setup.Shim_12_Inch_Antenna_HPR,
    MyPosition => And_OST.Ant_Align.Aft_Ant_GPS_Position,
    Relative   => And_OST.HR_RxTx_Link_State.
        Rel_Angles);
    And_OST.Ant_Align_Aux.Azm(1) :=
        And_OST.HR_RxTx_Link_State.Rel_Angles.Az;
    And_OST.Ant_Align_Aux.Elev(1) :=
        And_OST.HR_RxTx_Link_State.Rel_Angles.E1;
    And_OST.HR_RxTx_Link_State.Rel_Angles.Az :=
        And_OST.HR_RxTx_Link_State.Rel_Angles.Az +
        And_OST.Ant_Align.Delta_Heading_Aft_Ant(1);
    And_OST.HR_RxTx_Link_State.Rel_Angles.E1 :=
        And_OST.HR_RxTx_Link_State.Rel_Angles.E1 +
        And_OST.Ant_Align.Delta_Elevation_Aft_Ant(1);
    And_OST.Ant_Align_Aux.Hdg(1) :=
And_OST.Nav_Frame.Attitude.Heading;
    And_OST.Ant_Align_Aux.Pitch(1) :=
And_OST.Nav_Frame.Attitude.Pitch;
    And_OST.Ant_Align_Aux.Roll(1) :=
And_OST.Nav_Frame.Attitude.Roll;
    Prev_Align_Mode :=1;
        when 2 =>
And_OST.Scenario_Common.Platform_Setup.Shim_12_Inch_An-
tenna_HPR.
--   Heading :=0.0;
And_OST.Scenario_Common.Platform_Setup.Shim_12_Inch_An-
tenna_HPR.
--   Pitch :=0.0;
And_OST.Scenario_Common.Platform_Setup.Shim_12_Inch_An-
tenna_HPR.
--   Roll :=0.0;
    Antvec.PositionsToTrue(
    MyPosition    => And_OST.Ant_Align.AFt_Ant_GPS_Position,
    TargetPosition => And_OST.AntAlign.RF_Source_Position,
    True         => True_Az_E1);
    And_OST.HR_RxTx_Link_State.Angles := True_Az_E1;
    Antvec.TrueToRelative(
    True        => And_OST.HR_RxTx_Link_State.Angles,
    Attitude    => And_OST.Nav_Frame.Attitude,
    Shim_HIPR   => And_OST.Scenario_Common.
Platform_Setup.Shim_12_Inch_Antenna_HPR,
    MyPosition => And_OST.Ant_Align.Aft_Ant_GPS_Position,
    Relative   => And_OST.HR_RxTx_Link_State.
        Rel_Angles);
    And_OST.Mt_Align_Aux.Azm(2) :=
        And_OST.HR_RxTx_Link_State.Rel_Angles.Az;
    And_OST.Ant_Align_Aux.Elev(2) :=
        And_OST.HR_RxTx_Link_State.Rel_Angles.E1;
    And_OST.HR_RxTx_Link_State.Rel_Angles.Az :=
        And_OST.HR_RxTx_Link_State.Rel_Angles.Az +
        And_OST.Ant_Align.Delta_Heading_Aft_Ant(2);
    And_OST.HR_RxTx_Link_State.Rel_Angles.E1 :=
        And_OST.HR_RxTx_Link_State.Rel_Angles.E1 +
        And_OST.Ant_Align.Delta_Elevation_Aft_Ant(2);
    And_OST.Ant_Align_Aux.Hdg(2) :=
And_OST.Nav_Frame.Attitude.Heading;
    And_OST.Ant_Align_Aux.Pitch(2) :=
And_OST.Nav_Frame.Attitude.Pitch;
    And_OST.Ant_Align_Aux.Roll(2) :=
And_OST.Nav_Frame.Attitude.Roll;
    Prev_Align_Mode :=2;
        when 3 =>
And_OST.Scenario_Common.Platform_Setup.Shim_12_Inch_An-
tenna_HPR.
--   Heading :=0.0;
And_OST.Scenario_Common.Platform_Setup.Shim_12_Inch_An-
tenna_HPR.
--   Pitch :=0.0;
And_OST.Scenario_Common.Platform_Setup.Shim_12_Inch_An-
tenna_HPR.
--   Roll :=0.0;
    Sp1 := Trigrot.Sin(And_OST.Ant_Align_Aux.Pitch(1));
    Sa1 := Trigrot.Sin(And_OST.Ant_Align_Aux.Azm(1));
    Sr1 := Trigrot.Sin(And_OST.Ant_Align_Aux.Roll(1));
    Se1 := Trigrot.Sin(And_OST.Ant_Align_Aux.Elev(1));
    Cp1 := Trigrot.Cos(And_OST.Ant_Align_Aux.Pitch(1));
    Cal := Trigrot.Cos(And_OST.Ant_Align_Aux.Azm(1));
    Crl := Trigrot.Cos(And_OST.Ant_Align_Aux.Roll(1));
    Ce1 := Trigrot.Cos(And_OST.Ant_Align_Aux.Elev(1));
    Sp2 := Trigrot.Sin(And_OST.Ant_Align_Aux.Pitch(2));
    Sa2 := Trigrot.Sin(And_OST.Ant_Align_Aux.Azm(2));
    Sr2 := Trigrot.Sin(And_OST.Ant_Align_Aux.Roll(2));
    Se2 := Trigrot.Sin(And_OST.Ant_Align_Aux.Elev(2));
    Cp2 := Trigrot.Cos(And_OST.Ant_Align_Aux.Pitch(2));
    Ca2 := Trigrot.Cos(And_OST.Ant_Align_Aux.Azm(2));
    Cr2 := Trigrot.Cos(And_OST.Ant_Align_Aux.Roll(2));
    Ce2 := Trigrot.Cos(And_OST.Ant_Align_Aux.Elev(2));
    L1 := Float(And_OST.Ant_Align.Delta_Elevation_Aft_Ant(1))-
(Sp1*Sa1+Sr1*Cp1*Ca1)*Float(And_OST.Ant_Align.Delta_Head-
ing_Aft_Ant(1));
    L2 := Float(And_OST.Ant_Align.Delta_Elevation_Aft_Ant(2))-
(Sp2*Sa2+Sr2*Cp2*Ca2)*Float(And_OST.Ant_Align.Delta_Head-
```

TABLE I-continued

```
ing_Aft_Ant(2));
    Det := (Sa2*Ca1-Sa1*Ca2);
    if(abs(Det)>1.0e-30)then
        And_OST.Ant_Align_Aux.Roll_Trans :=
Bams.Bam32((Ca1*L2-Ca2*L1)/Det);
        And_OST.Ant_Align_Aux.Pitch_Trans :=
Bams.Bam32((Sa1*L2-Sa2*L1)/Det);
    D1 := (Se1*Sp1)-(Cr1*Cp1*Ce1*Ca1);
    if(abs(DI)>1.0e-30)then
    D2 := (Se2*Sp2)-(Cr2*Cp2*Ce2*Ca2);
    if(abs(D2)>1.0e-30)then
    Dh1 :=
((Ce1*Ca1)/D1)*Float(And_OST.Ant_Align.Delta_Head-
ing_Aft_Ant(1))-
((Se1*Sa1)/D1)*Float(And_OST.Ant_Align.Delta_Eleva-
tion_Aft_Ant(1))+
((Se1)/D1)*Float(And_OST.Ant_Align_Aux.Roll_Trans)-
((Sr1*Ce1*Ca1)/D1)*Float(And_OST.Ant_Align_Aux.Pitch_Trans);
    Dh2 :=
((Ce2*Ca2)/D2)*Float(And_OST.Ant_Align.Delta_Head-
ing_Aft_Ant(2))-
((Se2*Sa2)/D2)*Float(And_OST.Ant_Align.Delta_Eleva-
tion_Aft_Ant(2))+
((Se2)/D2)*Float(And_OST.Ant_Align_Aux.Roll_Trans)-
((Sr2*Ce2*Ca2)ID2)*Float(And_OST.Ant_Align_Aux.Pitch_Trans);
    And_OST.Ant_Align_Aux.Hdg_Trans :=
Bams.Bam32((Dh1+Dh2)/2.0);
And_OST.Scenario_Common.Platform_Setup.Shim_12_Inch_An-
tenna_HPR.Heading :=
And_OST.Ant_Align_Aux.Hdg_Trans;
And_OST.Scenario_Common.Platform_Setup.Shim_12_Inch_An-
tenna_HPR.Pitch :=
And_OST.Ant_Align_Aux.Pitch_Trans;
And_OST.Scenario_Common.Platform_Setup.Shim_12_Inch_An-
tenna_HPR.Roll :=
And_OST.Ant_Align_Aux.Roll_Trans;
    else
        And_OST.Ant_Align_Aux.Roll_Trans :=0.0;
        And_OST.Ant_Align_Aux.Pitch_Trans :=0.0;
        And_OST.Ant_Align_Aux.Hdg_Trans :=0.0;
    end if;
    else
        And_OST.Ant_Align_Aux.Roll_Trans :=0.0;
        And_OST.Ant_Align_Aux.Pitch_Trans :=0.0;
        And_OST.Ant_Align_Aux.Hdg_Trans :=0.0;
    end if;
    else
        And_OST.Ant_Align_Aux.Roll_Trans :=0.0;
        And_OST.Ant_Align_Aux.Pitch_Trans :=0.0;
        And_OST.Ant_Align_Aux.Hdg_Trans :=0.0;
    end if;
    Antvec.PositionsToTrue(
        MyPosition   => And_OST.Ant_Align.Aft_Ant_GPS_Position,
        TargetPosition => And_OST.Ant_Align.RF_Source_Position,
        True    => True_Az_E1);
    And_OST.HR_RxTx_Link_State.Angles :=True_Az_E1;
    Antvec.TrueToRelative(
        True    11 => And_OST.HR_RxTx_Link_State.Angles,
        Attitude => And_OST.Nav_Frame.Attitude,
        Shim_HPR => And_OST.Scenario_Common.
            Platform_Setup.Shim_12_Inch_Antenna_HPR,
        MyPosition => And_OST.Ant_Align.Aft_Ant_GPS_Position,
        Relative => And_OST.HR_RxTx_Link_State.
            Rel_Angles);
    And_OST.Ant_Align.Aft_Antenna_Align_Mode :=4;
    when 4=>
    Antvec.PositionsToTrue(
        MyPosition   => And_OST.Ant_Align.Aft_Ant_GPS_Position,
        TargetPosition => And_OST.Ant_Align.RF_Source_Position,
        True    => True_Az_E1);
    And_OST.HR_RxTx_Link_State.Angles :=True_Az_E1;
    Antvec.TrueToRelative(
        True    => And_OST.HR_RxTx_Link_State.Angles,
        Attitude => And_OST.Nav_Frame.Attitude,
        Shim_HPR => And_OST.Scenario_Common.
Platform_Setup.Shim_12_Inch_Antenna_HPR,
        MyPosition => And_OST.Ant_Align.Aft_Ant_GPS_Position,
        Relative => And_OST.HR_RxTx_Link_State.
            Rel_Angles);
    Prev_Align_Mode :=4;
    when 5 =>
    -- Store results in NVM.
    -- Need to wait 10 milliseconds between each write.
    case Prev_Align_Mode is
    when 1 =>
    -- Store results from mode 1 in NVM.
    Using_NVM.Ant_Align_Aux.Azm(1) :=
        And_OST.Ant_Align_Aux.Azm(1);
    Wait_Time :=ECDL_Timer.Set(Elapse => Ten_Msec);
    while not ECDL Timer.Has_Elapsed(Wait_Time) loop
    null;
    end loop;
    Using_NVM.Ant_Align_Aux.Elev(1) :=
        And_OST.Ant_Align_Aux.Elev(1);
    Wait_Time ECDL_Timer.Set(Elapse => Ten_Msec);
    while not ECDL_Timer.Has_Elapsed(Wait_Time) loop
    null;
    end loop;
    Using_NVM.Ant_Align_Aux.Hdg(1) :=
        And_OST.Ant_Align_Aux.Hdg(1);
    Wait_Time :=ECDL_Timer.Set(Elapse => Ten_Msec);
    while not ECDL_Timer.Has_Elapsed(Wait_Time) loop
    null;
    end loop;
    Using_NVM.Ant_Align_Aux.Pitch(1) :=
        And_OST.Ant_Align_Aux.Pitch(1);
    Wait_Time :=ECDL_Timer.Set(Elapse => Ten_Msec);
    while not ECDL_Timer.Has_Elapsed(Wait_Time) loop
    null;
    end loop;
    Using_NVM.Ant_Align_Aux.Roll(1) :=
        And_OST.Ant_Align_Aux.Roll(1);
    Wait_Time :=ECDL_Timer.Set(Elapse => Ten_Msec);
    while not ECDL_Timer.Has_Elapsed(Wait_Time) loop
    null;
    end loop;
    Using_NVM.Ant_Align.Delta_Heading_Aft_Ant(1) :=
    And_OST.Ant_Align.Delta_Heading_Aft_Ant(1);
    Wait_Time :=ECDL_Timer.Set(Elapse => Ten_Msec);
    while not ECDL_Timer.Has_Elapsed(Wait_Time) loop
    null;
    end loop;
    Using_NVM.Ant_Align.Delta_Elevation_Aft_Ant(1) :=
    And_OST.Ant_Align.Delta_Elevation_Aft_Ant(1);
    Wait_Time :=ECDL_Timer.Set(Elapse => Ten_Msec);
    while not ECDL_Timer.Has#Elapsed(Wait#Tim e) loop
    null;
    end loop;
    And_OST.Ant_Align.Aft_Antenna_Align_Mode :=15;
    when 2 >=
    -- Store results from mode 2 in NVM.
    Using_NVM.Ant_Align_Aux.Azm(2) :=
        And_OST.Ant_Align_Aux.Azm(2);
    Wait_Time :=ECDL_Timer.Set(Elapse => Ten_Msec);
    while not ECDL_Timer.Has_Elapsed(Wait_Time) loop
    null;
    end loop;
    Using_NVM.Ant_Align_Aux.Elev(2) :=
        And_OST.Ant_Align_Aux.Elev(2);
    Wait_Time :=ECDL_Timer.Set(Elapse => Ten_Msec);
    while not ECDL_Timer.Has_Elapsed(Wait_Time) loop
    null;
    end loop;
    Using_NVM.Ant_Align_Aux.Hdg(2) :=
        And_OST.Ant_Align_Aux.Hdg(2);
    Wait_Time :=ECDL_Timer.Set(Elapse => Ten_Msec);
    while not ECDL_Timer.Has_Elapsed(Wait_Time) loop
    null;
    end loop;
    Using_NVM.Ant_Align_Aux.Pitch(2) :=
        And_OST.Ant_Align_Aux.Pitch(2);
    Wait_Time :=ECDL_Timer.Set(Elapse => Ten_Msec);
    while not ECDL_Timer.Has_Elapsed(Wait_Time) loop
    null;
    end loop;
    Using_NVM.Ant_Align_Aux.Roll(2) :=
        And_OST.Ant_Align_Aux.Roll(2);
    Wait_Time :=ECDL_Timer.Set(Elapse => Ten_Msec),
```

TABLE I-continued

```
while not ECDL_Timer.Has_Elapsed(Wait_Time) loop
null;
end loop;
Using_NVM.Ant_Align.Delta_Heading_Aft_Ant(2) :=
And_OST.Ant_Align.Delta_Heading_Aft_Ant(2);
Wait_Time :=ECDL_Timer.Set(Elapse => Ten_Msec);
while not ECDL_Timer.Has_Elapsed(Wait_Time) loop
null;
end loop;
Using_NVM.Ant_Align.Delta_Elevation_Aft_Ant(2) :=
And_OST.Ant_Align.Delta_Elevation_Aft_Ant(2);
Wait_Time :=ECDL_Timer.Set(Elapse => Ten_Msec);
while not ECDL_Timer.Has_Elapsed(Wait_Time) loop
null;
end loop;
And_OST.Ant_Align.Aft_Antenna_Align_Mode :=15;
when 4 =>
-- Store shims in NVM.
Using_NVM.Scenario_Common.Platform_Setup.
      Shim_12_Inch_Antenna_HPR.Heading :=
And_OST.Scenario_Common.Platform_Setup.
      Shim_12_Inch_Antenna_HPR.Heading;
Wait_Time :=ECDL_Timer.Set(Elapse => Ten_Msec);
while not ECDL_Timer.Has_Elapsed(Wait_Time) loop
null;
end loop;
Using_NVM.Scenario_Common.Platform_Setup.
      Shim_12_Inch_Antenna_HPR.Pitch
And_OST.Scenario_Common.Platform_Setup.
      Shim_12_Inch_Antenna_HPR.Pitch;
Wait_Time :=ECDL_Timer.Set(Elapse => Ten_Msec);
while not ECDL_Timer.Has_Elapsed(Wait_Time) loop
null,
end loop;
Using_NVM.Scenario_Common.Platform_Setup.
      Shim_12_Inch_Antenna_HPR.Roll :=
And_OST.Scenario_Common.Platform_Setup.
      Shim_12_Inch_Antenna_HPR.Roll;
Wait_Time :=ECDL_Timer.Set(Elapse => Ten_Msec);
while not ECDL_Timer.Has_Elapsed(Wait_Time) loop
null;
end loop;
Using_NVM.Ant_Align_Aux.Roll_Trans :=
    And_OST.Ant_Align_Aux.Roll_Trans;
Wait_Time :=ECDL_Timer.Set(Elapse => Ten_Msec);
while not ECDL_Timer.Has_Elapsed(Wait_Time) loop
null;
end loop;
Using_NVM.Ant_Align_Aux.Pitch_Trans :=
    And_OST.Ant_Align_Aux.Pitch_Trans;
Wait_Time :=ECDL_Timer.Set(Elapse => Ten_Msec);
while not ECDL_Timer.Has_Elapsed(Wait_Time) loop
null;
end loop;
Using_NVM.Ant_Align_Aux.Hdg_Trans :=
    And_OST.Ant_Align_Aux.Hdg_Trans;
Wait_Time :=ECDL_Timer.Set(Elapse => Ten_Msec);
while not ECDL_Timer.Has_Elapsed(Wait_Time) loop
null;
end loop;
And_OST.Ant_Align.Aft_Antenna_Align_Mode :=15;
when others =>
null;
end case;
when 9 =>
And_OST.Ant_Align.Aft_Antenna_Align_Mode :=0;
when 10 =>
-- Zero shims in NVM and RAM.
Using_NVM.Scenario_Common.Platform_Setup.
      Shim_12_Inch_Antenna_HPR.Heading :=0.0;
Wait_Time :=ECDL_Timer.Set(Elapse => Ten_Msec);
while not ECDL_Timer.Has_Elapsed(Wait_Time) loop
null;
end loop;
And_OST.Scenario_Common.Platform_Setup.
      Shim_12_Inch_Antenna_HPR.Heading :=0.0;
Using_NVM.Scenario_Common.Platform_Setup.
      Shim_12_Inch_Antenna_HPR.Pitch :=0.0;
Wait_Time :=ECDL_Timer.Set(Elapse => Ten_Msec);
while not ECDL_Timer.Has_Elapsed(Wait_Time) loop
null;
end loop;
And_OST.Scenario_Common.Platform_Setup.
      Shim_12_Inch_Antenna_HPR.Pitch :=0.0;
Using_NVM.Scenario_Common.Platform_Setup.
      Shim_12_Inch_Antenna_HPR.Roll :=0.0;
Wait_Time :=ECDL_Timer.Set(Elapse => Ten_Msec);
while not ECDL_Timer.Has_Elapsed(Wait_Time) loop
null;
end loop;
And_OST.Scenario_Common.Platform_Setup.
      Shim_12_Inch_Antenna_HPR.Roll :=0.0;
Using_NVM.Ant_Align_Aux.Roll_Trans :=0.0;
Wait_Time :=ECDL Timer.Set(Elapse =>0 Ten_Msec);
while not ECDL_Timer.Has_Elapsed(Wait_Time) loop
null;
end loop;
And_OST.Ant_Align_Aux.Roll_Trans :=0.0;
Using_NVM.Ant_Align_Aux.Pitch_Trans :=0.0;
Wait_Time :=ECDL_Timer.Set(Elapse => Ten_Msec);
while not ECDL_Timer.Has_Elapsed(Wait_Time) loop
null;
end loop;
And_OST.Ant_Align_Aux.Pitch_Trans :=0.0;
Using_NVM.Ant_Align_Aux.Hdg_Trans :=0.0;
Wait_Time :=ECDL_Timer.Set(Elapse => Ten_Msec);
while not ECDL_Timer.Has_Elapsed(Wait_Time) loop
null;
end loop;
And_OST.Ant_Align_Aux.Hdg_Trans :=0.0;
And_OST.Ant_Align.Aft_Antenna_Align_Mode :=15;
when 15 =>
null; -- Stop writing NVM after one pass and wait
      -- for power off
when others =>
null;
end case;
end Align_Antenna;
```

Although the invention has be disclosed in the form of a preferred embodiment, those skilled in the art will be able to make alternative versions and the scope of the following claims is not meant to be limited to the particular version shown.

We claim:

1. A method of boresighting an A/B antenna positioned on an A/C comprising the steps of:

a) positioning the A/C over a surveyed reference position on the earth;

b) storing measured coordinates of the A/C and of a reference target RF source;

c) pointing the A/B antenna at the reference target with nominal values of Az and El and tuning the direction of said A/B antenna, using the received RF signal from said reference target as a measure of accuracy and recording $\Delta A_1$ and $\Delta E_1$;

d) rotating the A/C heading about said survey reference position and repeating steps b) and c), recording values $\Delta A_2$ and $\Delta E_2$;

calculating antenna bias parameters $\Delta R$, $\Delta P$, and $\Delta H$ for roll pitch and heading with respect to corresponding values of the A/C INS which brings the A/B antenna xyz frame into alignment with INS $X_1$ $Y_1$ $Z_1$ frame; and storing said antenna bias parameters, whereby measured antenna parameters may be adjusted in operation by said antenna bias parameters.

2. A method according to claim 1, further including a step of pointing the reference target antenna at the A/C and tuning the orientation of the reference source using the A/B antenna receive signal strength as a monitor.

3. A method according to claim 1, further comprising a preliminary step of a rough mechanical alignment of said antenna to within +/−½ degree of a nominal direction.

4. A method according to claim 2, further comprising a preliminary step of a rough mechanical alignment of said antenna to within +/−½ degree of a nominal direction.

5. A method according to claim 1, further comprising a step of performing a consistency check comprising aiming said A/B antenna at said reference target RF source and tuning the orientation of said antenna to maximize received power.

6. A method according to claim 2, further comprising a step of performing a consistency check comprising aiming said A/B antenna at said reference target RF source and tuning the orientation of said antenna to maximize received power.

7. A method according to claim 1, in which said reference target RF source is separated from said A/C by at least one kilometer and less than ten kilometers.

8. A method according to claim 2, in which said reference target RF source is separated from said A/C by at least one kilometer and less than ten kilometers.

9. A method according to claim 3, in which said reference target RF source is separated from said A/C by at least one kilometer and less than ten kilometers.

10. A method according to claim 4, in which said reference target RF source is separated from said A/C by at least one kilometer and less than ten kilometers.

* * * * *